J. Ollis,
Harvester Rake.
No. 28894. Patented June 26, 1860.
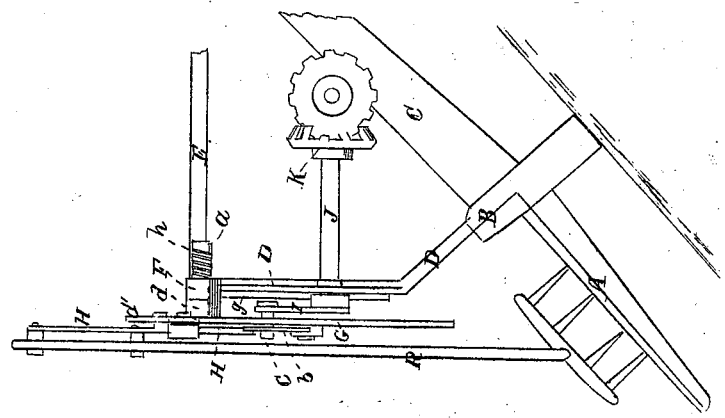
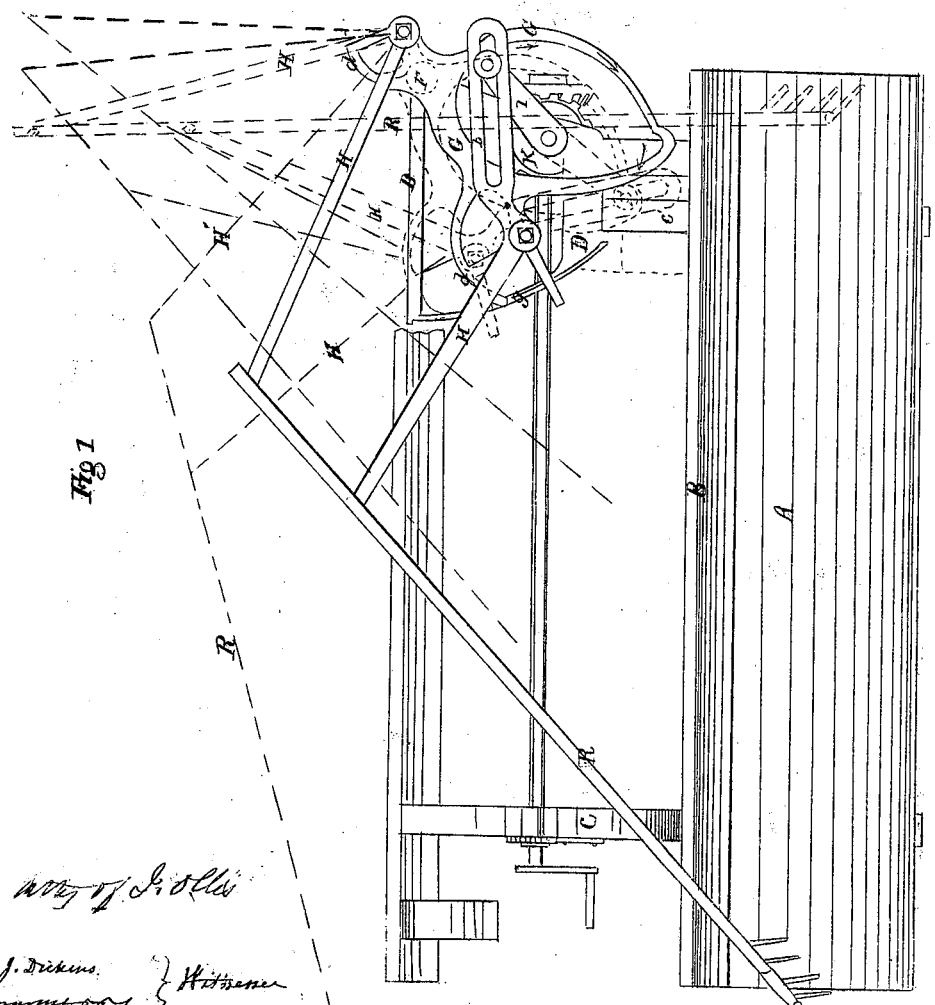

UNITED STATES PATENT OFFICE.

JOHN OLLIS, OF BLOOMINGTON, ILLINOIS.

IMPROVEMENT IN AUTOMATIC RAKES FOR HARVESTERS.

Specification forming part of Letters Patent No. 28,894, dated June 26, 1860.

*To all whom it may concern:*

Be it known that I, JOHN OLLIS, of Bloomington, in the county of McLean and State of Illinois, have invented a certain new and useful Improvement in Automatic Rakers for Harvesting-Machines, of which the following is a full, clear, and exact description, reference being had to the accompanying drawings, making part of this specification, in which—

Figure 1 represents a view in perspective of a machine embracing my improvement, the driving-wheel and gearing and supporting-wheel not being shown; and Fig. 2 represents an end elevation of the same, the machine being inclined at the same angle as that on which the perspective was taken.

My improvement consists in a new and improved mode of operating the rake, by which the cut grain is swept off the platform to the ground in gavels.

To enable others skilled in the art to make, construct, and use my improvement, I will now proceed to describe its parts in detail, omitting a particular description of such parts as are common to all harvesters, such as the knife and fingers, driving-wheel and gear, &c., neither of which are represented in the drawings, they not being essential to a full understanding of my invention.

In the accompanying drawings, A represents the platform, mounted on suitable framing, to the front part of which the cutting apparatus is to be attached. In the rear of the platform is secured a heavy cross-timber, B, and strongly bolted to the side rails, C C', of the frame of the machine. On this timber is erected and firmly bolted a standard, D, which forms the framework for the support of the raking apparatus, an inclined brace, E, firmly supporting it in rear. On the upper and outer corner of this frame is formed a bearing, F, for the pivot $a$ of a cam-yoke, G, to which are pivoted two arms, H and H', to the other ends of which is bolted the rake, R, in such manner as that the rake is free to oscillate or turn upon the bolts. The inner arm, H, has on its other ends a slotted arm, $b$, in which the wrist-pin $c$ of the crank $i$ plays, the crank receiving motion from the shaft J of the miter-gear K, on which it is mounted. On the rear of the two arms H and H' are formed grooves, which embrace curved guides $d$ and $d'$, formed on the cam-yoke, so as to steady them in their motion. The wrist-pin of the crank is arranged to operate against the inner side of the cam-yoke, and by it operate the rake, as represented in black, red, and blue lines in Fig. 1. For example, let us suppose the rake to be in the position shown in black lines and the crank revolving in the direction of the arrow. The wrist-pin, acting on the cam-yoke G and on the slotted end of the arm, H, will have caused the rake to have traversed over the platform in its passage to rake off the grain, and discharge it at the end in a gavel, as shown in red lines, and thence in its passage around the yoke forcing the cam and the slotted arm forward and then backward, causing the rake to assume the positions shown in blue lines until it attains its first position, as shown in black lines, and so on while the machine continues in motion, motion being communicated to the miter-gearing by suitable gearings from the driving-wheel. To prevent deflection of the cam-yoke a guideway, $g$, is formed on the standard D, against which it works. On the end of the pivot of the cam-yoke is arranged a spring, $h$, which keeps it up to its work.

Having thus described my invention, what I claim as new, and desire to secure by Letters Patent, is—

The mechanism, substantially as herein described, for operating the rake.

In testimony whereof I hereunto set my hand to this specification.

J. OLLIS.

Witnesses:
 JOHN M. STITNILL,
 GEO. W. PARKE.